United States Patent
Kahlon et al.

(12)

(10) Patent No.: US 6,396,240 B1
(45) Date of Patent: May 28, 2002

(54) JUMP START ASSEMBLY AND A METHOD FOR JUMP STARTING A VEHICLE HAVING A PAIR OF DISSIMILAR BATTERIES

(75) Inventors: Gurinder Singh Kahlon, Canton; Ning Liu, Novi; Robert Joseph Mohan; Arthur Joseph Gajewski, both of Canton, all of MI (US)

(73) Assignee: Visteon Global Tech., Co., Dearborn, MI (US)

( * ) Notice: Subject to any disclaimer, the term of this patent is extended or adjusted under 35 U.S.C. 154(b) by 0 days.

(21) Appl. No.: 09/655,567

(22) Filed: Sep. 6, 2000

(51) Int. Cl.7 ........................ H01M 10/44; H01M 10/46
(52) U.S. Cl. ........................................ 320/103; 320/105
(58) Field of Search ................................ 320/103, 104, 320/105, 116

(56) References Cited

U.S. PATENT DOCUMENTS

| 3,466,453 | A | 9/1969 | Greenberg |
| 4,726,786 | A | 2/1988 | Hill |
| 4,885,524 | A | 12/1989 | Wilburn |
| 4,999,562 | A | 3/1991 | Hill |
| 5,083,076 | A | 1/1992 | Scott |
| 5,696,434 | A | 12/1997 | Dennett |

*Primary Examiner*—Edward H. Tso
(74) *Attorney, Agent, or Firm*—Visteon Global Tech Inc.

(57) ABSTRACT

A jump-start assembly 13 for use within a vehicle 10 of the type having a pair of dissimilar batteries 12, 14. Assembly 13 allows the vehicle 10 to be selectively jump-started and electrical charge to be communicated to the battery 14 by the use of a single battery 62, 90.

20 Claims, 3 Drawing Sheets

JUMP START ASSEMBLY AND A METHOD FOR JUMP STARTING A VEHICLE HAVING A PAIR OF DISSIMILAR BATTERIES

FIELD OF THE INVENTION

This invention relates to a jump start assembly and a method for using the assembly to jump start a vehicle and more particularly, to a method and an assembly for allowing a vehicle having a pair of dissimilar batteries to be jump started by a vehicle having only a single battery.

BACKGROUND OF THE INVENTION

There is a need for greater amounts of electrical power within a vehicle due to the proliferation and disposition of various types of electrical power consuming devices within these vehicles. To address these increasing electrical power needs, many vehicles now include, or will include, a pair of batteries which typically comprise a twelve volt battery and a thirty six volt battery. These dissimilar batteries are typically connected in an electrical series type configuration and cooperatively increase the amount of supplied electrical power to the various vehicle devices over that which is provided by a conventional twelve volt vehicle battery. These batteries also individually and respectively provide electrical power to some of these devices. For example, the starter is typically, operatively and selectively connected to the thirty-six volt battery. Hence, about thirty-six volts of electricity is needed to allow the vehicle to be started.

While these two batteries do provide the required electrical power, they suffer from some drawbacks. That is, since most of the vehicles currently continue to employ only a single twelve volt battery, should these newer dual-battery type vehicles become disabled, due to a loss of electrical charge, they cannot typically be recharged by a single twelve-volt battery and cannot be "jump-started" (e.g. the starter cannot be activated by the single twelve-volt battery), thereby greatly inconveniencing the owner of such dual-battery vehicles.

There is, therefore, a need for an assembly that is adapted to allow vehicles having a pair of dissimilar batteries to be jump-started by a single battery. There is also a need for a method for efficiently jump-starting a dual battery type vehicle by use of a vehicle having a single battery.

SUMMARY OF THE INVENTION

It is a first object of the invention to provide an assembly which allows a dual battery type vehicle to be jump-started by use of a single battery.

It is a second object of the invention to provide a method to jump start a dual battery type vehicle by use of a single battery.

According to a first aspect of the present invention an assembly is provided for use with a first and a second battery which are disposed within a vehicle. The assembly comprises a first terminal which is coupled to the first and to the second battery; and a second terminal which is coupled to the first battery.

According to a second aspect of the present invention a method is provided for jump starting a vehicle of the type having a first and second battery by use of a third battery. The method comprises the steps of connecting the third battery to the second battery in an electrical series arrangement, thereby charging the first battery.

These and other features, advantages, and aspects of the present invention will become apparent from a reading of the following detailed description of the preferred embodiment of the invention in combination with the attached drawings.

DETAILED DESCRIPTION OF THE PREFERRED EMBODIMENT OF THE INVENTION

Figure 1:
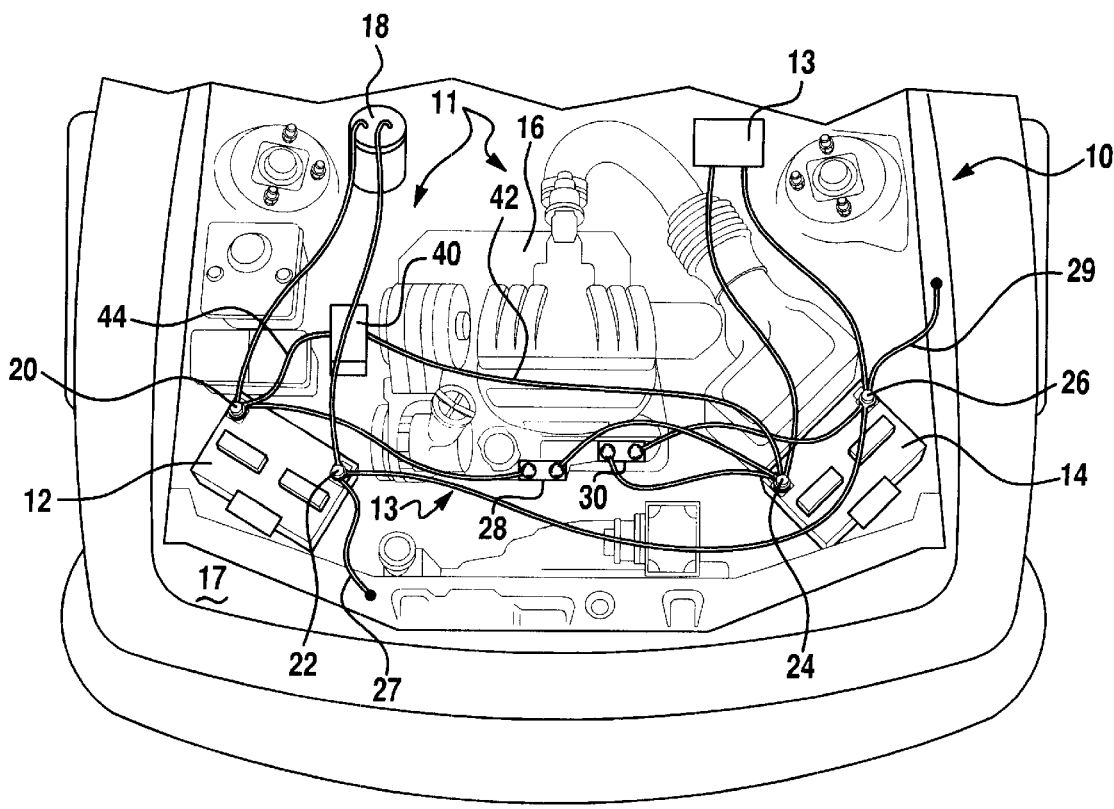
FIG. 1 is a top fragmented view of a vehicle incorporating a pair of dissimilar batteries and a jump start assembly which is made in accordance with the teachings of the preferred embodiment of the invention.
Figure 2:
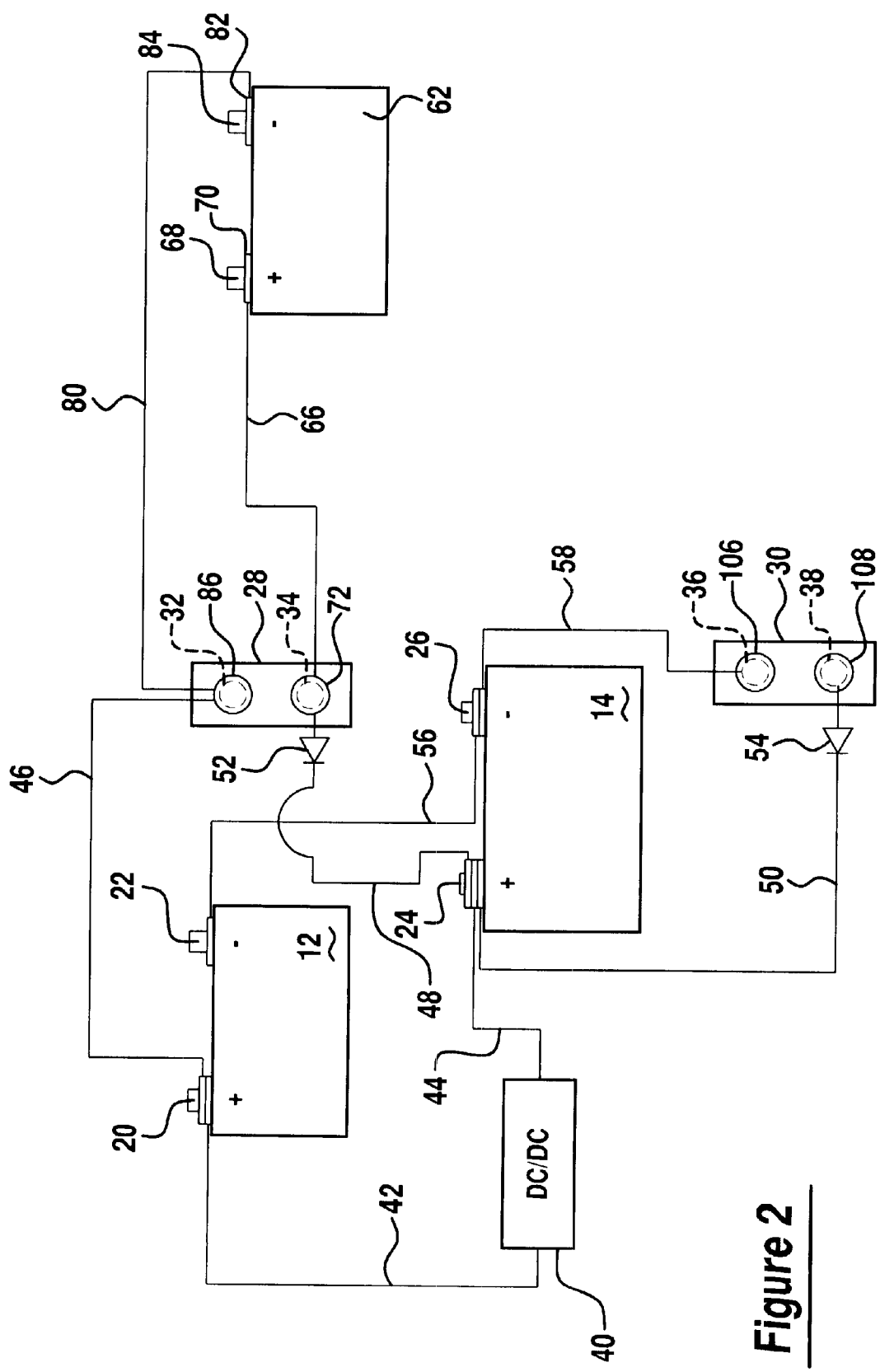
FIG. 2 is a schematic diagram illustrating the operative connection of the jump start assembly shown in FIG. 1 to a twelve-volt battery contained within a second vehicle.
Figure 3:
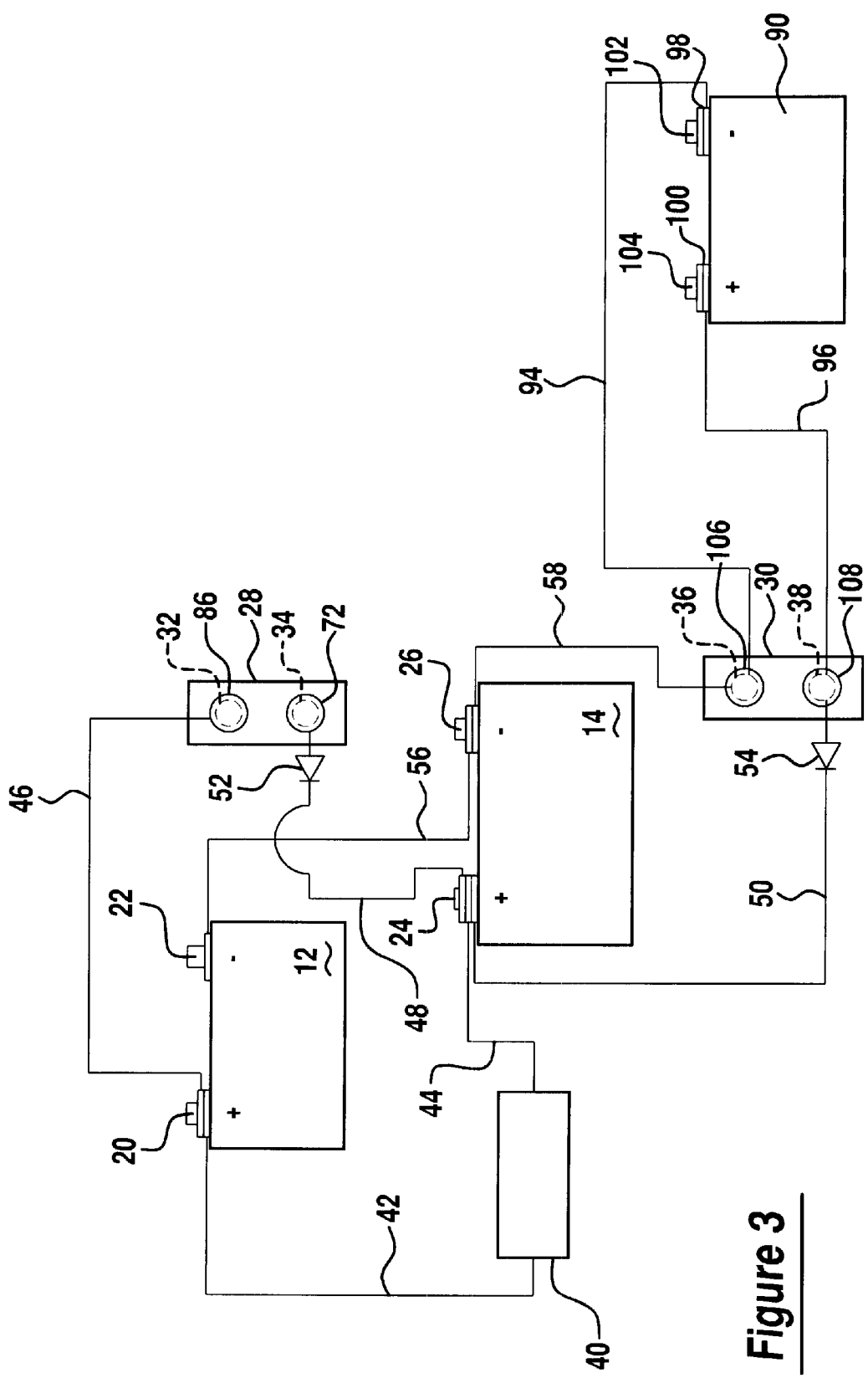
FIG. 3 is a schematic diagram illustrating the operative connection of the jump start assembly shown in FIG. 1 to a thirty-six volt battery contained within a second vehicle.

Referring now to FIGS. 1–3, there is shown a vehicle 10 which includes a battery assembly 11 having a pair of dissimilar batteries 12, 14 which are disposed proximate to the engine 16 and which cooperatively or individually provide electrical power to the various devices and components resident within the vehicle 10, such as the power steering pump 18 and the starter 8.

Particularly, battery 12 typically comprises a conventional twelve volt battery while battery 14 typically comprises a thirty six volt battery. Other batteries having different voltage may be used in alternate embodiments of the invention. Battery 12 includes a positively charged terminal 20 and a negatively charged terminal 22 while battery 14 similarly includes a positively charged terminal 24 and a negatively charged terminal 26.

Battery assembly 11 also includes a direct current to direct current converter 40 which is mounted upon the engine 16 and which is coupled to positive terminals 20 and 24 by respective busses 44 and 42, thereby allowing the batteries 12, 14 to be operatively coupled.

The starter 8 may be operatively connected to terminals 24 and 26 or terminals 20 and 22, thereby requiring about thirty-six volts of electricity to operate in the former configuration and about twelve volts of electricity to operate in the latter configuration. Typically, however, the starter 8 is connected to the battery 14. Terminals 22 and 26 are also connected by respective busses 27, 29 to the vehicle 10 and, more particularly, to the electrical ground potential provided by the vehicle 10. Vehicle 10 also includes a jump-start assembly 13 which is made in accordance with the teachings of the preferred embodiment of the invention. Particularly, jump start assembly 13 includes a pair of substantially identical terminals 28, 30 which are disposed upon the engine 16 or upon the front portion 17 of the vehicle 10, thereby being accessible even when the hood (not shown) of the vehicle 10 is closed.

Terminals 28, 30, in one non-limiting embodiment, provide respective apertures or "female receptacles" 32, 34; and 36, 38. Positive terminal 20 is coupled to or terminates within receptacle 32 by bus 46 while positive terminal 24 is coupled to or terminates within receptacles 34 and 38 by respective busses 48 and 50 and diodes 52 and 54. Negative terminals 22 and 26 are connected by bus 56 and negative terminal 26 is connected to and terminates within receptacle 36 by use of bus 58.

In this manner it should be appreciated that batteries 12 and 14 are in an electrical series connection arrangement and cooperatively provide about 48 volts of electricity to various vehicle devices and/or components. Batteries 12 and 14 may also individually and respectively provide electrical power to other devices. For example, the connection of a device, such as power steering pump 18 to the terminals 20, 22 of battery 12 allows the pump 18 to operate by use of only battery 12. The terminals 28 and 30 allow convenient access to the batteries 12, 14, even if the batteries are inaccessible or disposed within the trunk or other portion of the vehicle 10. Moreover, the terminals 28,30 may be selectively deployed in substantially any convenient location within the vehicle 10.

Should the vehicle 10 become immobilized and/or inoperable due to a loss of charge from battery 14 or from battery 14 and battery 12, the vehicle 10 may be jump-started (e.g. the starter 8 may be selectively activated) and electrical charge restored or communicated to the battery 14 or the combination of battery 14 and the battery 12, by use of a single battery residing within a vehicle.

For example, as shown best in FIG. 2, a second vehicle (not shown) having a single twelve volt battery 62 may jump start vehicle 10 by use of the jump start assembly 13. That is, a first connector 66 is attached to the positive terminal 68 of the battery 62 by use of a ring 70 which is electrically and physically and removably coupled to the connector 66 and which may receive and physically and electrically contact the terminal 68. The second end of the connector 66 forms a member 72 which generally conforms to the size and the shape of the receptacle 34 and which is selectively and removably inserted in the receptacle 34, thereby cooperating with the ring 70, bus 48, and the connector 66 to allow electrical continuity and communication to occur between terminals 24 and 68.

A second connector 80 having a ring 82 which is substantially identical to ring 70 is selectively and removably placed upon and receives negative terminal 84 of the battery 62. The second end of connector 80 further includes a member 86 which is selectively and removably inserted into the receptacle 32, thereby cooperating with the ring 82, the bus 46, and the connector 80 to allow electrical continuity and communication between terminals 20 and 84.

In this manner, battery 62 is connected in an electrical series arrangement with battery 12, thereby cooperating with battery 12 to provide about twenty-four volts of electrical charge to the battery 14, effective to increase the charge of the battery 14 and to jump-start the vehicle 10 by allowing starter 8, which is coupled to battery 14, to be selectively activated. Once the vehicle 10 has been jump started, connectors 80 and 66 are removed from battery 62 and terminal 28 and the automobile 10 may be driven. Diode 52 protects battery 14 from receiving a voltage or electrical charge from battery 62 which is of sufficient amplitude to damage the battery 14. Also, diode 52 protects the battery 62 from receiving damaging voltage from battery 14. It should be appreciated that, in this arrangement, battery 62 may comprise a twenty-four or a thirty-six volt battery.

Alternatively, as best shown in FIG. 3, a single thirty six volt battery 90 which is disposed within a vehicle (not shown) may be selectively used to charge the battery 14 and to jump start the vehicle 10, by use of substantially identical conductors 94, 96. Particularly, conductors 94, 96 have respective rings 98, 100 which selectively and respectively receive the negative and positive terminals 102, 104 of battery 90. These rings 98,100 physically and electrically connect terminals 102, 104 to respective connectors 94, 96. Further, each connector 94, 96 includes respective members 106, 108 which respectively conform to the size and the shape of receptacles 36, 38 and which are respectively adapted to be selectively and removably inserted into the receptacles 36, 38. In this manner, member 106 cooperates with ring 98, connector 94, and bus 58 to provide electrical continuity and communication between terminals 102 and 26. Similarly, member 108 cooperates with ring 100, bus 50, and connector 96 to provide electrical continuity and communication between terminals 104 and 24.

It should be apparent that the foregoing connection arrangement provides for the connection of battery 90 to battery 14 in an electrical parallel manner, effective to increase the charge of battery 14 and to jump-start the vehicle 10 (i.e. allow the starter 8 to be selectively activated). After the vehicle 10 has been jump-started, the connectors 94 and 96 may be removed from battery 90 and the connector 30 and the automobile 10 may be driven. Diode 54 protects battery 14 from receiving a voltage or electrical charge from battery 90 which has sufficient amplitude to damage the battery 14. Also, diode 54 protects the battery 90 from receiving damaging voltage from battery 14.

In another embodiment of the invention, terminals 28, 30 may be replaced by a single terminal having three receptacles. The first two of these receptacles are substantially and respectively identical to receptacles 38 and 34 and are connected in the manner shown in FIGS. 1–3. The third receptacle is connected to terminal 26 by bus 58 and to terminal 20 by bus 46. This third terminal therefore is adapted to operatively receive member 86 or member 106 in the manner which is previously described and shown in FIGS. 2–3. Further, connectors 80,66 may form a single sheathed bus and connectors 94, 96 may also form a single sheathed bus.

The invention is not limited to the exact construction or method which has been illustrated and described above, but that various changes may be made without departing from the spirit and the scope of the various inventions as delineated within the claims.

What is claimed is:

1. An assembly for use with a vehicle having a first battery of a first type and a second battery of a second type, said assembly comprising a terminal which allows said second battery to be electrically charged by use of a third battery of said first type.

2. The assembly of claim 1 wherein said first type comprises a twelve-volt battery.

3. The assembly of claim 2 wherein said second type comprises a thirty-six volt battery.

4. The assembly of claim 1 wherein said terminal is connected to said first and second battery.

5. The assembly of claim 1 further comprising a second terminal which allows said second battery to be electrically charged by use of a fourth battery of said second type.

6. The assembly of claim 5 wherein said first and second terminals are substantially identical.

7. The assembly of claim 1 wherein said first and second batteries are coupled to a direct current to direct current converter.

8. A jump start assembly for use within a vehicle having a pair of dissimilar batteries, each of said batteries having a respective positively charged and a negatively charged terminal, said assembly comprising;

a first member which is coupled to said positively charged and to said negatively charged terminal of a first of said pair of dissimilar batteries; and a second member which is coupled to said positively charged terminal of a second of said pair of dissimilar batteries and to said positively charged terminal of said first of said pair of dissimilar batteries, effective to allow said vehicle to be jump started by a third battery.

9. The jump start assembly of claim 8 wherein said first of said pair of said dissimilar batteries comprises a thirty-six volt battery.

10. The jump start assembly of claim 9 wherein said second of said pair of said dissimilar batteries comprises a twelve-volt battery.

11. The jump start assembly of claim 10 wherein said third battery comprises a twelve-volt battery.

12. The jump start assembly of claim 10 wherein said third battery comprises a thirty-six volt battery.

13. The jump start assembly of claim 8 wherein said first member is coupled to a diode, said diode being further coupled to said positively charged terminal of said first of said pair of dissimilar batteries.

14. The jump start assembly of claim 8 wherein said second member is coupled to a diode, said diode being further coupled to said positively charged terminal of said first of said pair of dissimilar batteries.

15. A method for jump starting a vehicle of the type having a first battery and a second battery by use of a third battery, said method comprising the steps of;

providing a member;

connecting said member to said first and second batteries;

connecting said third battery to said member, effective to place said third battery in an electrical series arrangement with said second battery, thereby causing said vehicle to be jump started.

16. The method of claim 15 wherein said first and third batteries each comprise twelve-volt batteries.

17. The method of claim 16 where said second battery comprises a thirty-six volt battery.

18. The method of claim 15 further comprising the step of coupling a diode to said second battery and to said member.

19. The method of claim 15 further comprising the step of providing a second member and;

coupling said second terminal to said first battery.

20. The method of claim 19 further comprising the step of coupling a diode to said first battery and to said second member.

* * * * *